(12) United States Patent
Su et al.

(10) Patent No.: US 9,081,456 B2
(45) Date of Patent: Jul. 14, 2015

(54) TOUCH PANEL CONTROL SYSTEM, CAPACITANCE DETECTION APPARATUS AND METHOD THEREOF

(71) Applicant: MStar Semiconductor, Inc., Hsinchu County (TW)

(72) Inventors: Yu-Che Su, Hsinchu County (TW); Jia-Hong Huang, Hsinchu County (TW); Wen-Chieh Yang, Hsinchu County (TW); Tai-Lai Tung, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 29 days.

(21) Appl. No.: 14/064,350

(22) Filed: Oct. 28, 2013

(65) Prior Publication Data

US 2014/0125625 A1    May 8, 2014

(30) Foreign Application Priority Data

Nov. 8, 2012    (TW) .............................. 101141617 A

(51) Int. Cl.
*G06F 3/041*    (2006.01)
*G06F 3/044*    (2006.01)

(52) U.S. Cl.
CPC ................ *G06F 3/044* (2013.01); *G06F 3/041* (2013.01); *G06F 3/0412* (2013.01)

(58) Field of Classification Search
CPC ...... G06F 3/041; G06F 3/04125; G06F 3/044
USPC ......................................................... 345/173
See application file for complete search history.

(56) References Cited

U.S. PATENT DOCUMENTS

| | | | |
|---|---|---|---|
| 5,880,411 A * | 3/1999 | Gillespie et al. ........... | 178/18.01 |
| 5,905,489 A * | 5/1999 | Takahama et al. ............ | 345/174 |
| 7,868,874 B2 * | 1/2011 | Reynolds ..................... | 345/173 |
| 8,519,970 B2 * | 8/2013 | Westhues et al. ............. | 345/173 |
| 8,605,054 B2 * | 12/2013 | Krenik et al. ................. | 345/174 |
| 8,970,544 B1 * | 3/2015 | Mohindra ..................... | 345/174 |
| 2007/0109274 A1 * | 5/2007 | Reynolds ..................... | 345/173 |
| 2010/0327882 A1 * | 12/2010 | Shahparnia et al. .......... | 324/659 |
| 2012/0056841 A1 * | 3/2012 | Krenik et al. ................. | 345/174 |
| 2012/0268142 A1 * | 10/2012 | Kremin et al. ................. | 324/658 |
| 2012/0303890 A1 * | 11/2012 | Benhase et al. ............... | 711/114 |
| 2012/0313890 A1 * | 12/2012 | Mohindra ..................... | 345/174 |

* cited by examiner

*Primary Examiner* — Jason Mandeville
(74) *Attorney, Agent, or Firm* — WPAT, PC; Justin King

(57) ABSTRACT

A capacitance detection apparatus for a touch panel includes an N number of capacitors. The detection apparatus generates an N number of different input signals, and provides an $i^{th}$ input signal of the input signals to an $i^{th}$ capacitor. The N number of input signals correspond to a delayed sequence of a maximum length sequence or the maximum length sequence. The detection apparatus sums up an N number of response signals, which are generated after providing the N number of input signals to the N number of capacitors, to generate a summed signal. The summed signal is multiplied by the $i^{th}$ input signal and integrated to generate an $i^{th}$ integrated signal. The detection apparatus estimates capacitance values of the N number of capacitors according to the N number of integrated signals, respectively.

12 Claims, 9 Drawing Sheets

TOUCH PANEL CONTROL SYSTEM, CAPACITANCE DETECTION APPARATUS AND METHOD THEREOF

This application claims the benefit of Taiwan application Serial No. 101141617, filed Nov. 8, 2012, the subject matter of which is incorporated herein by reference.

BACKGROUND OF THE INVENTION

1. Field of the Invention

The invention relates in general to a touch panel control system, and more particularly to a technique for measuring a capacitance value in a capacitive touch panel.

2. Description of the Related Art

Operating interfaces of recent electronic products are becoming increasingly user-friendly and intuitive. For example, through a touch panel, a user can directly interact with applications as well as input messages/texts/patterns with fingers or a stylus, thus eliminating complications associated with other input devices such as a keyboard or buttons. According to a touch position on the touch panel and a currently displayed image on the display, an electronic device determines an intention of the touch panel to execute corresponding operations.

Existing touch panel control techniques can be roughly categorized into resistive, capacitive, electromagnetic sensing, ultrasonic and optical types. A capacitive touch panel includes multiple electrodes, whose capacitance values can be changed by a user touch. By measuring whether capacitance changes occur in the electrodes, a position of a touch point can be determined. FIG. 1 shows a stereotypic capacitance detection circuit, with a capacitor Cx representing a detected capacitor. Relations of an input voltage Vi, a reference voltage Vpp and an output voltage Vo can be represented as follows:

$$\frac{Vo - Vpp}{\frac{1}{SCfb}} = \frac{Vpp - Vi}{\frac{1}{SCx}} \qquad \text{equation (1)}$$

Given the input voltage Vi, the reference voltage Vpp and a capacitance value of a feedback capacitor Cfb, the capacitance value of the detected capacitor Cx can be deduced according to the output voltage Vo. For example, assuming that the reference voltage Vpp is set as a ground voltage, an absolute value of the output voltage Vo and the capacitance value of detected capacitor Cx displays a predetermined directly proportional relationship.

Taking FIG. 2 depicting an electrode array formed by multiple rhombus electrodes for example, through switching by a multiplexer, electrodes E11 to E75 may be sequentially connected to an operational amplifier 12 in a detection circuit 100 to serve as the detected capacitor Cx. In other words, the detection circuit 100 may be utilized to sequentially detect the capacitance value of each of the electrodes. However, such method suffers from a drawback such that, the detection circuit 100 is capable of measuring the capacitance value of only one electrode at a time, and thus is particularly unsuitable for applications of large touch panel control areas due to its slow detection speed.

FIG. 3 shows a detection circuit 300 capable of simultaneously measuring multiple capacitance values of the prior art. Assume that the number of the capacitors is five, and input voltages provided to detected capacitors C1 to C5 are different, as shown in FIG. 3. An operational amplifier 32 and a feedback capacitor Cfb equivalently form a summation circuit, which provides a summation result including the five items:

$$\frac{\cos(2\pi * M * t)}{Cfb} * C1, \frac{\cos(2\pi * 2M * t)}{Cfb} * C2, \frac{\cos(2\pi * 3M * t)}{Cfb} * C3,$$

$$\frac{\cos(2\pi * 4M * t)}{Cfb} * C4 \text{ and } \frac{\cos(2\pi * 5M * t)}{Cfb} * C5,$$

where M represents a predetermined frequency.

An analog-to-digital converter (ADC) 34 converts output voltages (i.e., the above summation result) of the operational amplifier 32 to a digital signal. Correspondingly, subsequent multipliers 36A to 36E as well as integrators 38A to 38E are all digital circuits. Integration interval lengths of the integrators 38A to 38E are all (1/M). For a path at which the multiplier 36A and the integrator 38A are located, after passing through the integrator 38A, theoretically, only the item originally corresponding to the frequency M remains while integration results of the other four items are zero. Therefore, the output signal of the integrator 38A is associated with only the capacitance value of the capacitor C1 and is unassociated with the capacitance values of the capacitors C2 to C5. Thus, the capacitance value of the capacitor C1 can be deduced according to the output signal of the multiplier 38A. Similarly, for a path at which the multiplier 36B and the integrator 38B are located, after passing through the integrator 38B, only the item originally corresponding to the frequency 2M remains, and the output signal of the integrator 38B is associated with only the capacitance value of the capacitor C2. Likewise, according to the output signals of the integrators 38B to 38E, the capacitance values of the capacitors C2 to C5 can be deduced.

However, the detection circuit 300 suffers from certain drawbacks. For one example, it is possible that five sinusoidal signals provided to the detected capacitors C1 to C5 are in-phase signals, in a way that the summation result generated at the output end of the operational amplifier 32 shows a peak value. It is understood that, a variation range in the voltage of output signals of the operational amplifier 32 increases as the number of detected capacitors gets larger, leading to a rise in a peak-to-average power ratio (PAPR). Thus, an operational amplifier having a larger linear operation interval is required as the operational amplifier 32. Further, under a constant resolution, the ADC 34 also needs to have a broader input voltage range. The above issues result in increases in both power consumption and hardware costs.

SUMMARY OF THE INVENTION

The invention is directed to a capacitance detection apparatus and a detection method thereof for overcoming the above issues. By utilizing a signal generated according to a maximum length sequence as a voltage provided to a detected capacitor, the detection apparatus and the detection method thereof are capable of simultaneously detecting multiple capacitance values and providing a signal-to-noise ratio (SNR) preferred over that of the prior art. Further, circuits in the detection apparatus according to the present invention are required to withstand a lower peak-to-average power ration (PAPR) compared to the prior art.

According to an embodiment of the present invention, a detection apparatus is provided. The detection apparatus is for detecting an N number of capacitors in a touch panel, where N is an integer greater than 1. The detection apparatus comprises a voltage generator, a summation module, an N number of multipliers, an N number of integrators and an estimation module. The voltage generator generates an N number of input signals, and provides an $i^{th}$ input signal of the N number of input signals to an $i^{th}$ capacitor of the N number of capacitors. The N number of input signals are different, and correspond to a delayed sequence of a maximum length sequence or the maximum length sequence; and i is an integral index between 1 and N. The summation module sums up an N number of response signals generated after providing the N number of input signals to the N number of capacitors to generate a summed signal. An $i^{th}$ multiplier of the N number of multipliers multiplies the summed signal to generate an $i^{th}$ multiplied signal. An $i^{th}$ integrator of the N number of integrators integrates the $i^{th}$ multiplied signal to generate an $i^{th}$ integrated signal. The estimation module estimates capacitances of the N number of capacitors according to the N number of integrated signals, respectively.

According to another embodiment of the present invention, a capacitive touch panel control system is provided. The capacitive touch panel control system comprises a touch panel, a voltage generator, a summation module, an N number of multipliers, an N number of integrators and an estimation module. The touch panel comprises an N number of capacitors, where N is an integer greater than 1. The voltage generator generates an N number of input signals, and provides an $i^{th}$ input signal of the N number of input signals to an $i^{th}$ capacitor of the N number of capacitors. The N number of input signals are different, and correspond to a delayed sequence of a maximum length sequence or the maximum length sequence; and i is an integral index between 1 and N. The summation module sums up an N number of response signals, which are generated after providing the N number of input signals to the N number of capacitors, to generate a summed signal. An $i^{th}$ multiplier of the N number of multipliers multiplies the summed signal by the $i^{th}$ input signal to generate an $i^{th}$ multiplied signal. An $i^{th}$ integrator of the N number of integrators integrates the $i^{th}$ multiplied signal to generate an $i^{th}$ integrated signal. The estimation module estimates capacitances of the N number of capacitors according to the N number of integrated signals, respectively.

According to yet another embodiment of the present invention, a detection method is provided. The detection method is for detecting an N number of capacitors in a touch panel, where N is an integer greater than 1. The detection method comprises the following steps. An N number of input signals are generated, and an $i^{th}$ input signal of the N number of input signals is provided to an $i^{th}$ capacitor of the N number of capacitors. The N number of input signals are different, and correspond to a delayed sequence of a maximum length sequence or the maximum length sequence; and i is an integral index between 1 and N. An N number of response signals generated after providing the N number of input signals to the N number of capacitors are summed up to generate a summed signal. The summed signal is multiplied by $i^{th}$ input signal to generate an $i^{th}$ multiplied signal. The $i^{th}$ multiplied signal is integrated to generate an $i^{th}$ integrated signal. Capacitance values of the N number of capacitors are estimated according to the N number of integrated signals, respectively.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 4:
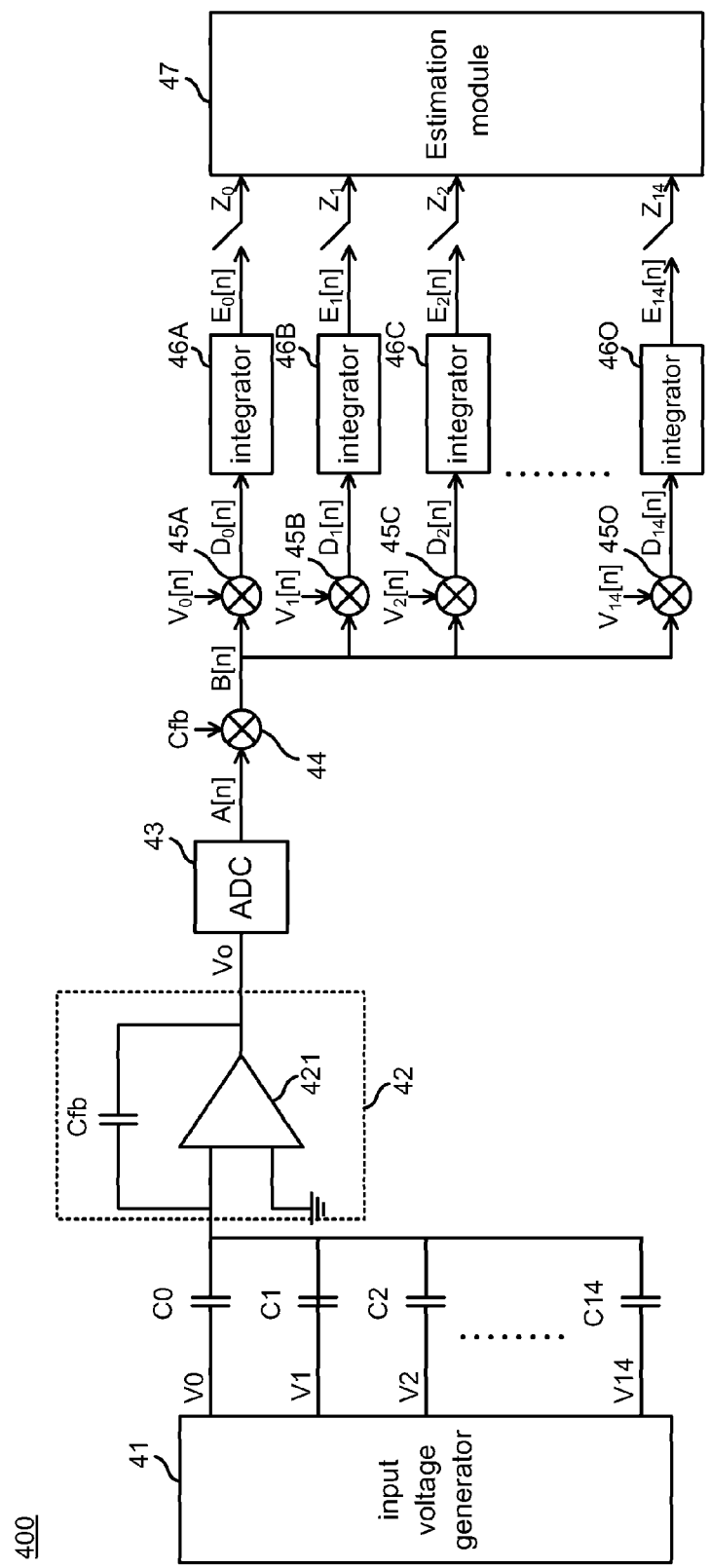
FIG. 4 is a functional block diagram of a capacitance detection apparatus

FIG. 4 shows a functional block diagram of a capacitance detection apparatus for a capacitive touch panel according to an embodiment of the present invention. A detection apparatus 400 comprises a voltage generator 41, a summation module 42, an analog-to-digital converter (ADC) 43, a multiplier 44, multipliers 45A to 45O, integrators 46A to 46O, and an estimation module 47. In the description below, an example of the detection apparatus 400 detecting 15 capacitors is given. It should be noted that, the number of capacitors is not limited to 15. Further, the numbers of the multipliers and integrators in the detection apparatus 400 may be adjusted according to the number of capacitors, with associated details to be described shortly.

Figure 5A:
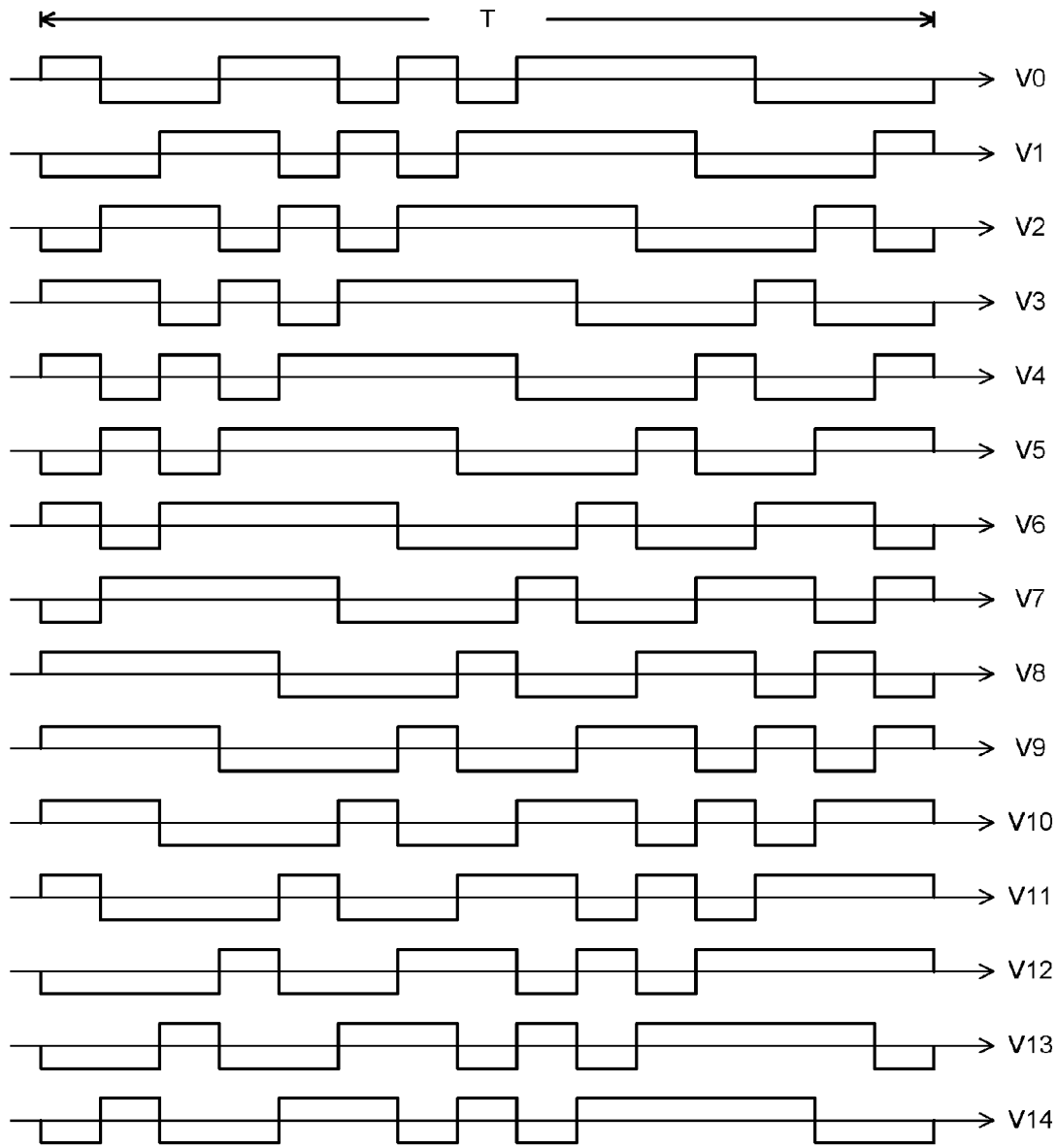
FIGS. 5A to 5C are examples of input signals according to an embodiment of the present invention.

In the embodiment, the voltage generators 41 generates 15 input signals V0 to V14, and provides the input signals V0 to V14 to capacitors C0 to C14, respectively. Each of the 15 capacitors C0 to C14 has a first end and a second end, the voltage generator provides the $i^{th}$ input signal to the first end of the $i^{th}$ capacitor. The input signals V0 to V14 are different, and correspond to a delayed sequence of a maximum length sequence or the maximum length sequence. A maximum length sequence is characterized in that, "0" is replaced by "1", "1" is replaced by "−1", and a sum of values in one period is "−1"; autocorrelation is performed on a selected sequence, such that discrete values of the selected sequence are all "+1" and a summed value is a length value of the selected sequence; after down-shifting the originally selected sequence by one digit, a summed value of autocorrelation function values within one period length is "−1"; and, after continuing down-shifting by one digit, a summed value of autocorrelation function values within one period length is also "−1". It can be easily appreciated by a person having ordinary skill in the art that, a maximum length sequence includes an M number of bits, where M is equal to $2^n-1$, and n is an integer greater than 1. That is to say, a total bit count of a maximum length sequence may be 3, 7, 15, . . . . FIG. 5A shows an example including the input signals V0 to V14. In the example, a maximum length sequence is the maximum length sequence having a total bit count of 15, with the 15 bits being [0 0 0 1 1 1 1 0 1 0 1 1 0 0 1]. As a maximum length sequence is cyclic, a sequence generated after delaying the maximum length sequence is [1 0 0 0 1 1 1 1 0 1 0 1 1 0 0]. As shown in FIG. 5A, the input signal V0 corresponds to the maximum length sequence itself ("0" represents a negative voltage, and "1" represents a positive voltage), the input signal V1 corresponds to a delayed sequence from delaying the maximum length sequence by one bit, and the input signals V2 to V14 are delayed sequences from delaying a previous sequence by one bit, respectively.

Figure 5B:
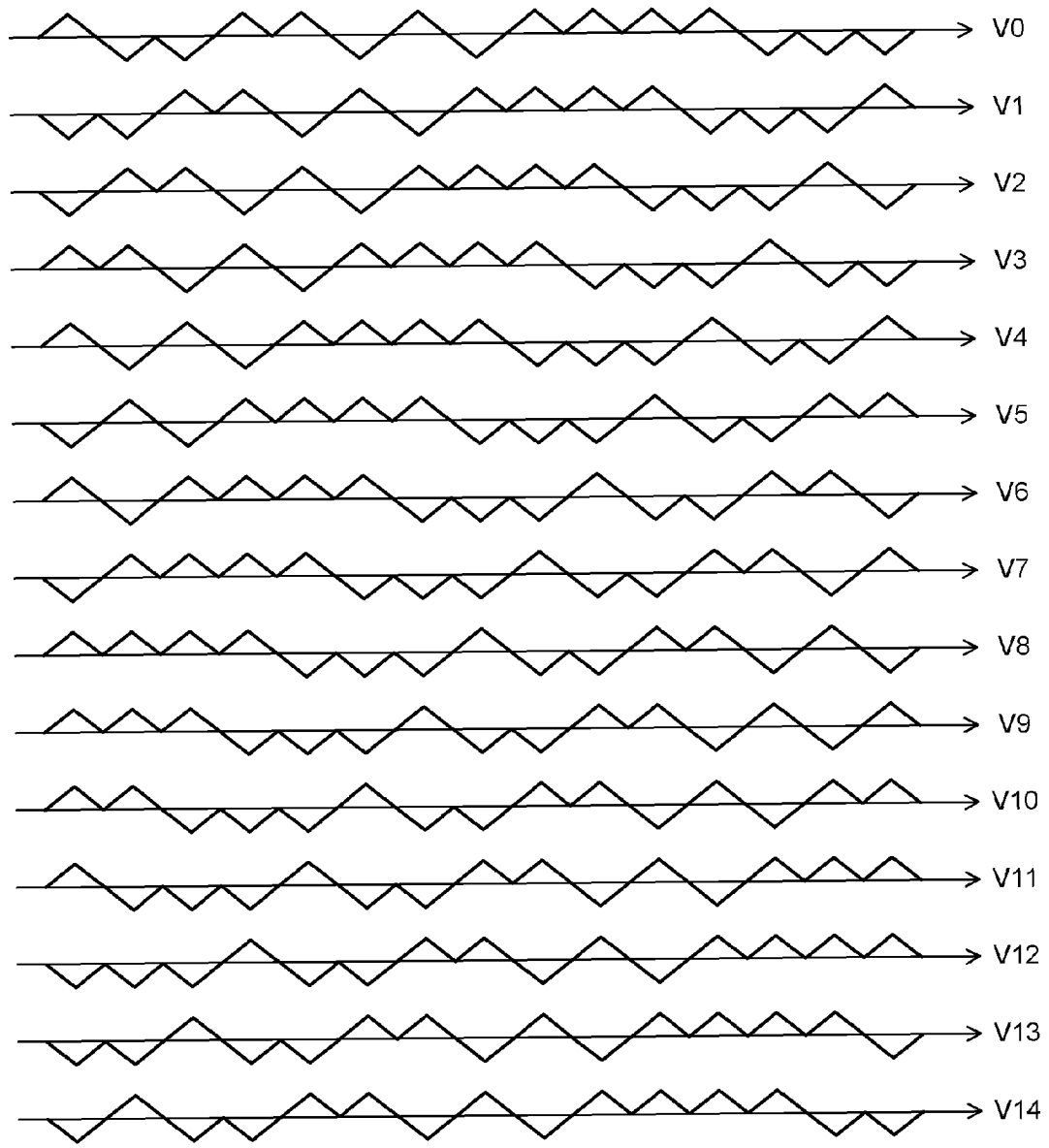
Figure 5C:
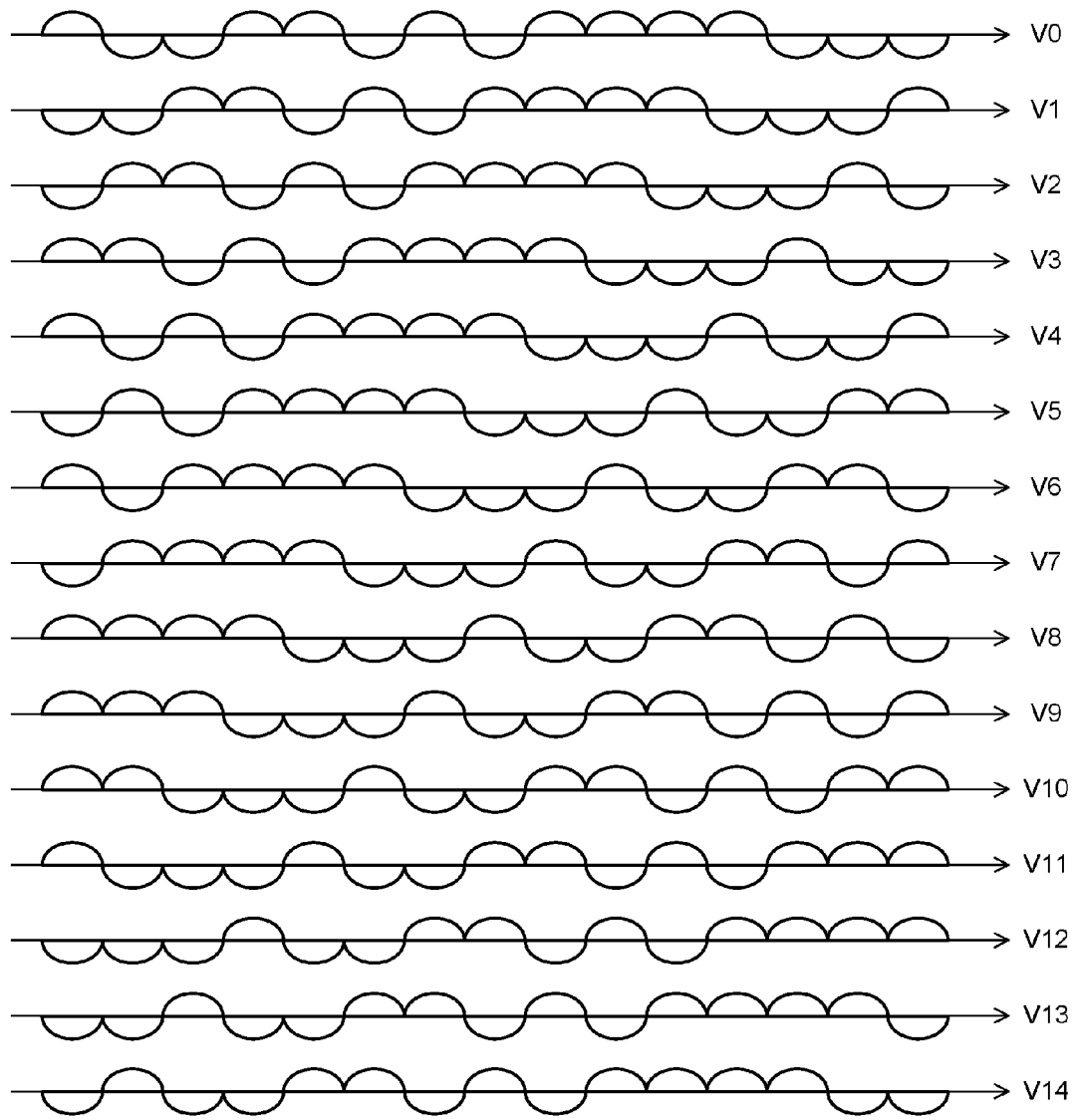

In practice, the maximum length sequence and the delayed sequences may be first burned and recorded in a read-only memory (ROM), or sequence values may be dynamically generated by a maximum length sequence generating circuit, for reference of the voltage generator 41 to generate the input signals V0 to V14. Referring to FIGS. 5B and 5C showing other examples, instead of being square waves, pulses corresponding to the bits may also be triangle waves, semicircle waves or other waveforms.

After the voltage generator 41 provides the input signals V0 to V14 to the capacitors C0 to C14, respectively, different response signals are triggered in respective subsequent circuits. The summation module 42 sums up the response signals to generate a summed signal Vo. In the embodiment, the summation module 42 comprises an operational amplifier 421 and a feedback capacitor Cfb. The operational amplifier 421 comprises a first input end, a second input end and an output end, the first input end is coupled to a reference potential end, the second ends of the N number of capacitors are coupled to the second input end, and the feedback capacitor Cfb is coupled between the second input end and the output end. The summed signal Vo includes 15 items corresponding to the different detected capacitors, respectively:

$$Vo = \frac{V_0}{C_{fb}}C_0 + \frac{V_1}{C_{fb}}C_1 + \frac{V_2}{C_{fb}}C_2 + \ldots + \frac{V_{14}}{C_{fb}}C_{14} \quad \text{equation (2)}$$

After the ADC 43, the summed signal Vo is converted to a digital signal A[n]:

$$A[n] = \frac{V_0[n]}{C_{fb}}C_0 + \frac{V_1[n]}{C_{fb}}C_1 + \frac{V_2[n]}{C_{fb}}C_2 + \ldots + \frac{V_{14}[n]}{C_{fb}}C_{14} \quad \text{equation (3)}$$

In the above equations, $C_{fb}$ represents a capacitance value in the feedback capacitor Cfb, $C_0$ to $C_{14}$ represent capacitance values of the detected capacitors C0 to C14, and $V_0[n]$ to $V_{14}[n]$ are sample values of the input signals V0 to V14, respectively. It is known to a person having ordinary skill in the art that, other implementation details of internal circuits of the summation module 42 are also feasible. A summation circuit is applicable given that summation circuit renders the digital signal A[n] to include a sum of the 15 items of $V_0[n]*C_0, V_1[n]*C_1, \ldots,$ and $V_{14}[n]*C_{14}$.

Figure 1:
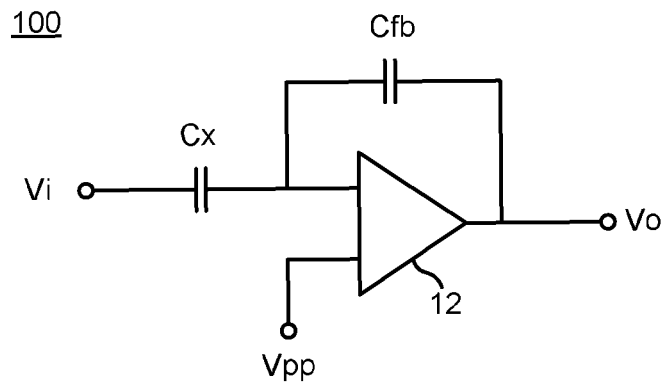
FIG. 1 is a typical capacitance detection circuit.
Figure 2:
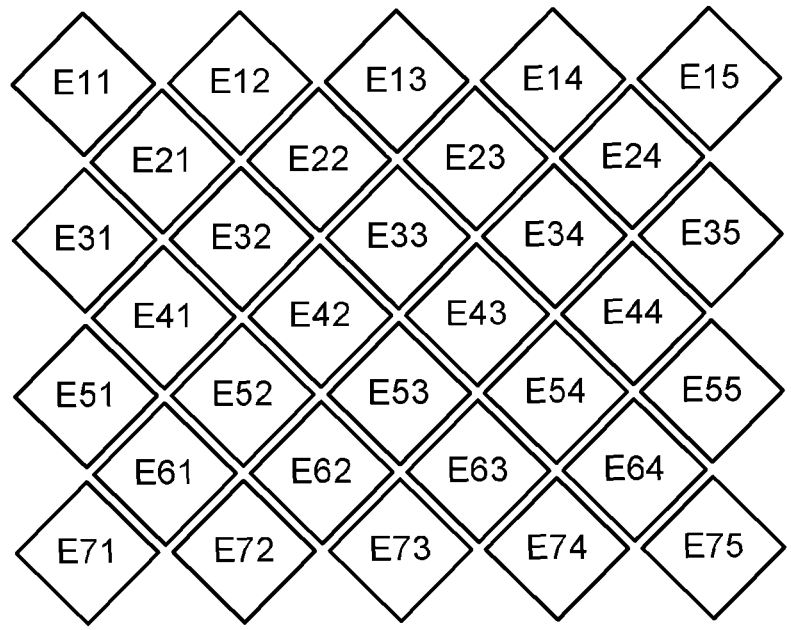
FIG. 2 is an electrode array formed by multiple rhombus electrodes.
Figure 3:
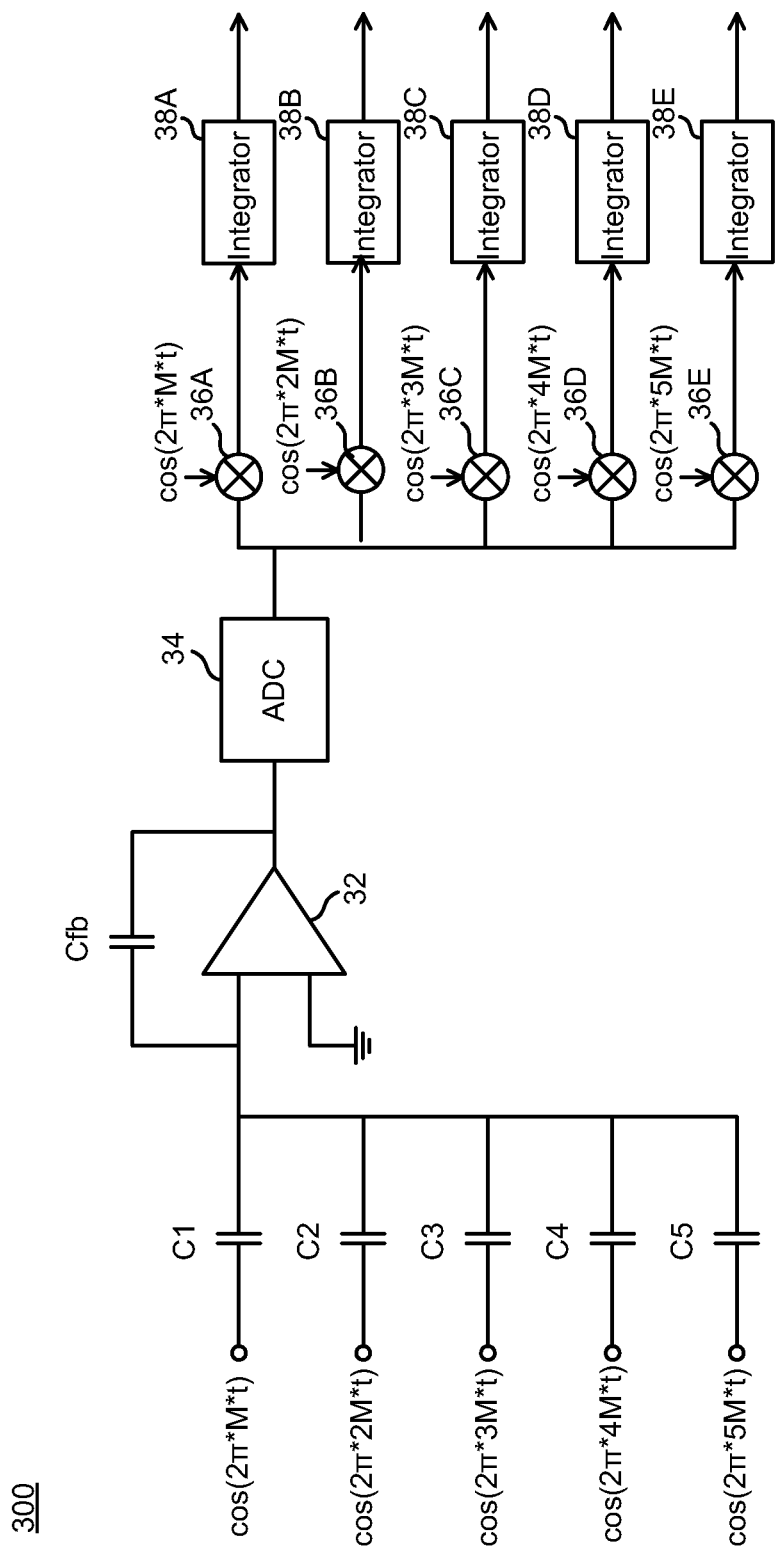
FIG. 3 is a detection apparatus capable of simultaneously detecting multiple capacitance values of the prior art.

It should be noted that, it is impossible that the input signals V0 to V14 generated according to the maximum length sequence be all in-phase signals at the same time, and so the summed signal Vo does not present a peak value as the prior art in FIG. 3. That is, the summed signal Vo has a lower peak-to-average power ratio (PAPR). It is demonstrated that, although the capacitance detection apparatus according to the embodiment of the present invention employs an operational amplifier having an smaller linear operation range and an ADC having a smaller input voltage range, it is capable of achieving reduced power consumption and reduced hardware costs.

After being multiplied by the multiplier $C_{fb}$ through the multiplier 44, the digital signal A[n] is adjusted into a digital signal B[n]:

$$B[n] = V_0[n]C_0 + V_1[n]C_1 + V_2[n]C_2 + \ldots + V_{14}[n]C_{14} \quad \text{equation (4)}$$

The digital signal B[n] is then provided to 15 different operation paths to serve as multiplicands. The multipliers of the multipliers 45A to 45O are $V_0[n], V_1[n], \ldots$ and $V_{14}[n]$, respectively. Taking the path of the multiplier $V_0[n]$ for example, after passing through the multiplier 45A having a multiplier as the input signal $V_0[n]$, the digital signal B[n] is adjusted into a digital signal $D_0[n]$:

$$D_0[n] = V_0^2[n]C_0 + V_0[n]V_1[n]C_1 + V_0[n]V_2[n]C_2 + \ldots + V_0[n]V_{14}[n]C_{14} \quad \text{equation (5)}$$

In practice, the multiplier $C_{fb}$ provided by the multiplier 44 may be integrated into the multipliers 45A to 45O, or the digital signal A[n] is omitted and is directly processed by the estimation signal 47, to reduce the number of multipliers in the overall circuit.

The integrator 46A integrates the digital signal $D_0[n]$, with an integration result $E_0[n]$ expressed as:

$$E_0[n] = E_0[n-1] + D_0[n] \quad \text{equation (6)}$$

In the embodiment, an integration interval length of the integrator 46A is equal to the maximum length sequence period T in FIG. 5A. Take the waveform of the input signals V0 to V14 as the square waves shown in FIG. 5A for example. Assume that the estimation module 47 samples from the integration result $E_0[n]$ at an interval of T and prompts the integrator 46A to restart the integration process, a product of two signals when the two signals have the same voltage is 1, and a product of the two signals when the two signals have different voltages is −1. Based on characteristics of a maximum length sequence, when the integration interval length is equal to T, an integration result of products of any one of the signals $V_0[n]$ to $V_{14}[n]$ and the signal itself is 15. On the other hand, an integration result of products of any two of the signals $V_0[n]$ to $V_{14}[n]$ is −1. Therefore, a standardized sample result $Z_0$ that the estimation module 47 obtains from an output end of the integrator 46A is:

$$Z_0 = 15C_0 - C_1 - C_2 - \ldots - C_{14} \quad \text{equation (7)}$$

Similarly, a standardized sample result $Z_1$ that the estimation module 47 obtains from an output end of the integrator 46B is:

$$Z_1 = 15C_1 - C_0 - C_2 - \ldots - C_{14} \quad \text{equation (8)}$$

Likewise, the estimation module 47 obtains a total of 15 standardized sample results from the integrators 46A to 46O. According to the 15 simultaneous equations, the estimation module 47 estimates 15 capacitance values $C_0$ to $C_{14}$. For example, a sum S of the 15 standardized sample results $Z_0$ to $Z_{14}$ is:

$$S = Z_0 + Z_1 + \ldots + Z_{14} = C_0 + C_1 + C_2 + \ldots + C_{14} \quad \text{equation (9)}$$

Figure 6:
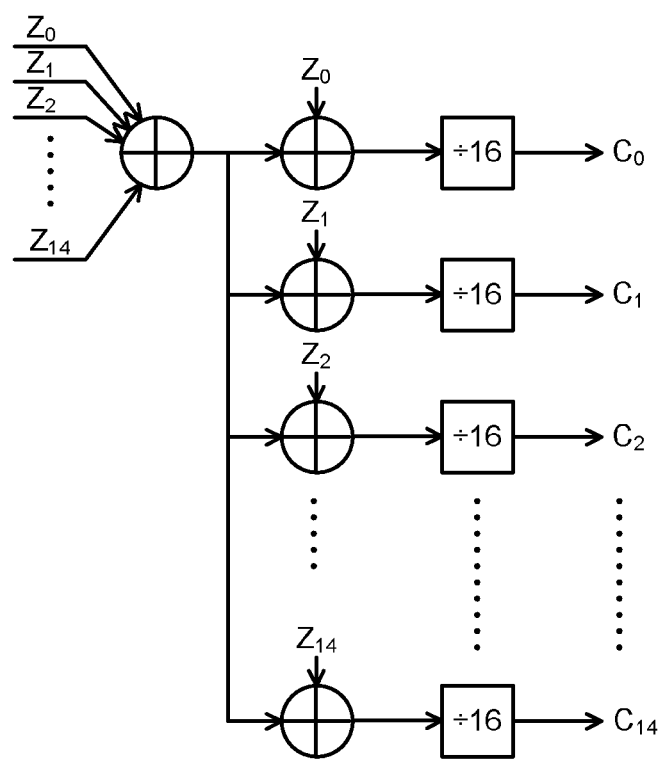
FIG. 6 is an exemplary internal circuit of an estimation module according to an embodiment of the present invention.

A summed result of the sum S and the sample result $Z_0$ is $16*C_0$. By dividing the summed result by 16, the value of $C_0$ can be obtained. FIG. 6 shows an exemplary internal circuit of the estimation module 47 when the integration interval lengths of the integrators 46A to 46O are all equal to T. The estimation module 47 as shown in FIG. 6 comprises a sum adder for adding the 15 integrated signals to generate a total sum result; 15 sub-adders, of which an $i^{th}$ sub-adder adds an $i^{th}$ integrated signal to the total summed result to generate an $i^{th}$ summed result; and 15 dividers, of which an $i^{th}$ divider divides the $i^{th}$ summed result by 16 to generate the capacitance value of the $i^{th}$ capacitor.

It should be noted that, the integration interval lengths of the integrators are neither limited to the period T nor being the same. For example, provided that the integration interval length and the corresponding sampling interval period are both predetermined integral multiples of the period T, the sample results obtained by the estimation module 47 are integral multiples of the foregoing sample results. Further, if the integration interval lengths of the integrators are different, a main effect is only that, coefficients of the simultaneous equations are not limited to 15 and −1. Even if the integration interval lengths of the integrators are different and are non-integral multiples of the period T, given the integration interval lengths, the estimation module 47 is nonetheless capable of appropriately selecting the corresponding sampling time. Therefore, the coefficients of the simultaneous equation can still be obtained to also deduce the capacitance values $C_0$ to $C_{14}$.

It should be noted that, with analog multipliers and analog integrators adopted in the detection apparatus 400, the effect of calculating the capacitance values as above can still be achieved. Thus, the ADC 43 is an optional element.

Further, the number of detected capacitors and the bit count included in the maximum length sequence are not necessarily equal to each other. For example, when the number of detected capacitors is 14, a designer of the detection apparatus 400 may select any 14 of the foregoing signals V0 to V14 as the input signals. Alternatively, when the number of detected capacitors is 22, the designer may utilize the detection apparatus 400 in FIG. 4 to detect 15 of the capacitance values, and utilize another detection apparatus to detect the remaining 7 capacitance values. The other detection apparatus may generate input signals according to a maximum length sequence having a total bit count that is equal to 7.

Figure 7:
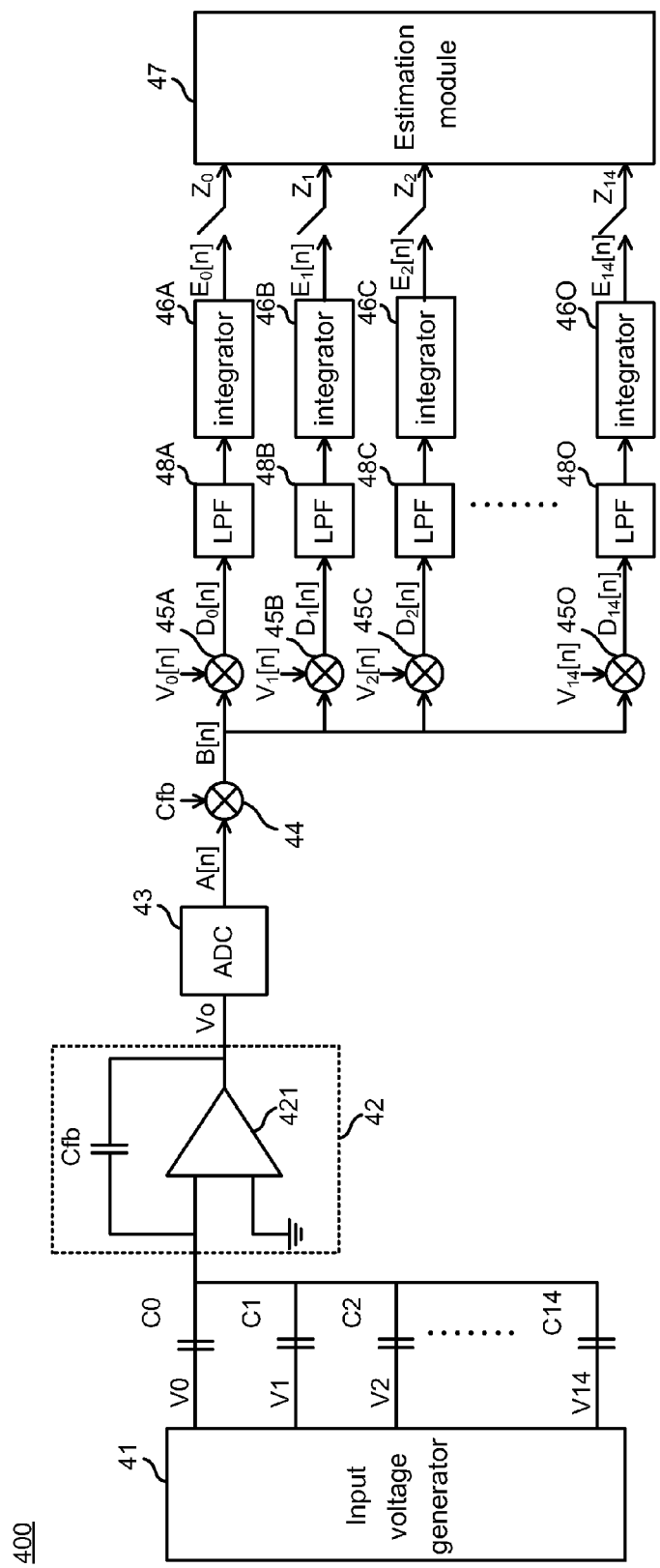
FIG. 7 is an example of a detection apparatus further comprising a filter according to an embodiment of the present invention.

In another embodiment, as shown in FIG. 7, the detection apparatus 400 further comprises low-pass filters 48A to 48O respectively disposed at different operation paths. The low-pass filters 48A to 48O are for filtering out high-frequency noises from the output signals of the multipliers 45A to 45O.

It should be noted that, a signal-to-noise ratio (SNR) of the detection apparatus 400 according to the embodiment of the present invention is preferred over that of the prior art. Assume that the standardized sample results $Z_0$ to $Z_{14}$ obtained by the estimation module 47 respectively carry noise components $I_{Zi}$:

$$\begin{cases} Z_0 = 15C_0 - C_1 - C_2 - \ldots - C_{14} + I_{Z0} \\ Z_1 = 15C_1 - C_0 - C_2 - \ldots - C_{14} + I_{Z1} \\ Z_2 = 15C_2 - C_0 - C_1 - \ldots - C_{14} + I_{Z2} \\ \quad\quad\vdots \\ Z_{14} = 15C_{14} - C_0 - C_1 - \ldots - C_{13} + I_{Z14} \end{cases} \quad \text{equation (10)}$$

Energy characteristics of the noise components are:

$$\begin{cases} \sigma_I^2 = E[I_{Z0}^2] = \ldots = E[I_{Z14}^2] \\ E[I_{Zm}I_{Zn}] = 0; m \neq n \end{cases} \quad \text{equation (11)}$$

A sum of the standardized sample results $Z_0$ to $Z_{14}$ can be represented as:

$$S = \sum_{i=0}^{14} Z_i = C_0 + C_1 + C_2 + \ldots + C_{14} + I_{Z0} + I_{Z1} + \ldots + I_{Z14} \quad \text{equation (12)}$$

As previously stated, the sum S is first added to the standardized sample results $Z_0$ to $Z_{14}$, respectively, and then divided by 16 to obtain estimation values of the capacitance values $C_0$ to $C_{14}$, respectively:

$$\begin{cases} \hat{C}_0 = (Z_0 + S)\frac{1}{16} = C_0 + \frac{1}{16}(2I_{D0} + I_{D1} + \ldots + I_{D14}) \\ \hat{C}_1 = (Z_1 + S)\frac{1}{16} = C_1 + \frac{1}{16}(I_{D0} + 2I_{D1} + \ldots + I_{D14}) \\ \quad\quad\vdots \\ \hat{C}_{14} = (Z_{14} + S)\frac{1}{16} = C_{14} + \frac{1}{16}(I_{D0} + I_{D1} + \ldots + 2I_{D14}) \end{cases} \quad \text{equation (13)}$$

As deduced from equations (11) and (13), the SNR of the estimation values is:

$$SNR \approx \frac{16C_i^2}{\sigma_i^2} \quad \text{equation (14)}$$

It is seen from equation (14) that, the SNR of the detection apparatus 400 is greater than the SNR of the prior art by 16 times (i.e., with a 12 dB difference).

According to another embodiment of the present invention, a capacitive touch panel control system is provided. The capacitive touch panel control system comprises a touch panel, a voltage generator, a summation module, an N number of multipliers, an N number of integrators and an estimation module. The touch panel comprises an N number of capacitors, where N is an integer greater than 1. In practice, the numbers of the multipliers and the integrators may be adjusted according to the number of capacitors.

The voltage generator generates an N number of input signals, and provides an $i^{th}$ input signal of the N number of input signals to an $i^{th}$ capacitor of the N number of capacitors. The N number of input signals are different, and correspond to a delayed sequence of a maximum length sequence or the maximum length sequence; and i is an integral index between 1 and N. The summation module sums up an N number of response signals generated after providing the N number of input signals to the N number of capacitors to generate a summed signal. An $i^{th}$ multiplier of the N number of multipliers multiplies the summed signal to generate an $i^{th}$ multiplied signal. An $i^{th}$ integrator of the N number of integrators integrates the $i^{th}$ multiplied signal to generate an $i^{th}$ integrated signal. The estimation module estimates capacitances of the N number of capacitors according to the N number of integrated signals, respectively. Details of various circuit operation modes and variations (e.g., the waveforms and corresponding relationships of the input signals) associated with the detection apparatus 400 are applicable to the capacitive touch panel control system, and shall be omitted herein.

According to yet another embodiment of the present invention, a detection method is provided. The detection method is for detecting an N number of capacitors in a touch panel, where N is an integer greater than 1, with a process of the detection method shown in FIG. 8. The detection method comprises the following steps. In step S81, an N number of input signals are generated and an $i^{th}$ input signal of the N number of input signals is provided to an $i^{th}$ capacitor of the N number of capacitors. The N number of input signals are different, and correspond to a delayed sequence of a maximum length sequence or the maximum length sequence; and i is an integral index between 1 and N. In step S82, an N number of response signals generated after providing the N number of input signals to the N number of capacitors are summed up to generate a summed signal. In step S83, the summed signal is multiplied by the $i^{th}$ input signal to generate an $i^{th}$ multiplied signal. In step S84, the $i^{th}$ multiplied signal is integrated to generate an $i^{th}$ integrated signal. In step S85, capacitance values of the N number of capacitors are estimated according to the N number of integrated signals, respectively.

Figure 8:
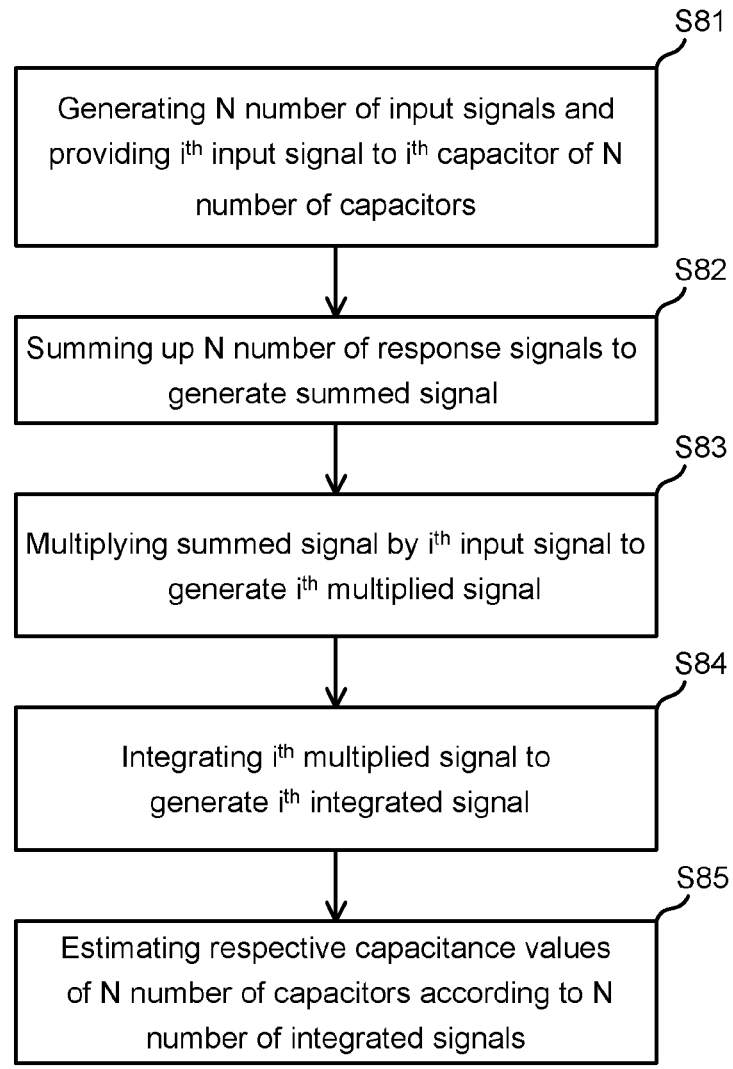
FIG. 8 is a flowchart of a capacitance detection method according to an embodiment of the present invention.

Details of various circuit operations and modifications given in descriptions associated with the detection apparatus 400 are applicable to the detection method in FIG. 8, and shall be omitted herein.

A capacitance detection apparatus and a detection method thereof of the present invention are as disclosed by the above embodiments. By utilizing a signal generated according to a maximum length sequence as a voltage provided to a detected capacitor, the detection apparatus and the detection method thereof are capable of simultaneously detecting multiple capacitance values and providing an SNR preferred over that of the prior art. Further, circuits in the detection apparatus according to the present invention are required to withstand a lower PAPR compared to the prior art.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detection apparatus, for detecting an N number of capacitors in a touch panel to determine a touch position on the touch panel, N being an integer greater than 1, comprising:
    a voltage generator, for generating an N number of input signals, and providing an ith input signal of the N number of input signals to an ith capacitor of the N number of capacitors, wherein the N number of input signals are different and respectively correspond to one of a delayed sequence of a maximum length sequence and the maximum length sequence, and i is an integral index of N between 1 and N;
    a summation module, for summing up an N number of response signals, which are generated after providing the N number of input signals to the N number of capacitors, to generate a summed signal;
    an N number of multipliers, of which an ith multiplier multiplies the summed signal by the ith input signal to generate an ith multiplied signal;
    an N number of integrators, of which an ith integrator integrates the ith multiplied signal to generate an ith integrated signal, wherein the maximum length sequence has a period, each of the N number of integrators has an integration interval length, and the integration interval length is a P multiple of the period and P is a positive integer; and
    an estimation module, for estimating capacitance values of the N number of capacitors according to the N number of integrated signals, respectively, wherein the estimation module samples the ith integrated signal at every predetermined interval, and the predetermined interval is the P multiple of the period;
    wherein the maximum length sequence comprises an M number of bits, wherein M is equal to $2^n-1$, n is an integer greater than 1, and N is equal to M and the estimation module further comprises:
        a sum adder, for adding the N number of integrated signals to generate a total summed result;
        an N number of sub-adders, of which an ith sub-adder adds an ith integrated signal of the N number of integrated signals to the total summed result to generate an ith summed result; and
        an N number of dividers, of which an ith divider divides the ith summed result by $P*(N+1)$ to generate the capacitance value of the ith capacitor.

2. The detection apparatus according to claim 1, wherein a delay amount of the at least one delayed sequence of a maximum length sequence relative to the maximum length sequence is in a unit of bits.

3. The detection apparatus according to claim 1, wherein each of the N number of capacitors has a first end and a second end, the voltage generator provides the $i^{th}$ input signal to the first end of the $i^{th}$ capacitor, and the summation module comprises:
    a feedback capacitor; and
    an operational amplifier, comprising a first input end, a second input end and an output end, wherein the first input end is coupled to a reference potential end, the second ends of the N number of capacitors are coupled to the second input end, and the feedback capacitor is coupled between the second input end and the output end.

4. The detection apparatus according to claim 3, wherein the summation module further comprises:
    an analog-to-digital converter (ADC), for converting an analog signal generated by the output end of the operational amplifier to a digital signal as the summed signal.

5. The detection apparatus according to claim 1, further comprising: an N number of low-pass filters, of which an $i^{th}$ low-pass filter is disposed between the $i^{th}$ multiplier and the $i^{th}$ integrator, and filters out high-frequency noises from the $i^{th}$ multiplied signal.

6. The detection apparatus according to claim 1, wherein each of the N number of input signals is a square wave signal, a triangle wave signal, or a semicircle signal.

7. A capacitive touch panel control system, comprising:
    a touch panel, comprising an N number of capacitors to determine a touch position on the touch panel, where N is an integer greater than 1;
    a voltage generator, for generating an N number of input signals, and providing an ith input signal of the N number of input signals to an ith capacitor of the N number of capacitors, wherein the N number of input signals are different and respectively correspond to one of a delayed sequence of a maximum length sequence and the maximum length sequence, and i is an integral index of N between 1 and N;
    a summation module, for summing up an N number of response signals generated after providing the N number of input signals to the N number of capacitors to generate a summed signal;
    an N number of multipliers, of which an ith multiplier multiplies the summed signal by the ith input signal to generate an ith multiplied signal;
    an N number of integrators, of which an ith integrator integrates the ith multiplied signal to generate an ith integrated signal, wherein the maximum length sequence has a period, each of the N number of integrators has an integration interval length, and the integration interval length is a P multiple of the period and P is a positive integer; and
    an estimation module, for estimating capacitance values of the N number of capacitors according to the N number of integrated signals, respectively, wherein the estimation module samples the ith integrated signal at every predetermined interval, and the predetermined interval is the P multiple of the period;

wherein the maximum length sequence comprises an M number of bits, wherein M is equal to $2^n-1$, n is an integer greater than 1, and N is equal to M and the estimation module further comprises:

a sum adder, for adding the N number of integrated signals to generate a total summed result;

an N number of sub-adders, of which an ith sub-adder adds an ith integrated signal of the N number of integrated signals to the total summed result to generate an ith summed result; and an N number of dividers, of which an ith divider divides the ith summed result by P*(N+1) to generate the capacitance value of the ith capacitor.

8. A detection method, for detecting an N number of capacitors in a touch panel to determine a touch position on the touch panel, N being an integer greater than 1, and the detection method comprising:

a) generating an N number of input signals, and providing an ith input signal of the N number of input signals to an ith capacitor of the N number of capacitors, wherein the N number of input signals are different and respectively correspond to one of a delayed sequence of a maximum length sequence and the maximum length sequence, and i is an integral index of N between 1 and N, wherein the maximum length sequence comprises an M number of bits, M is equal to $2^n-1$, n is an integer greater than 1, and N is equal to M;

b) summing up an N number of response signals, which are generated after providing the N number of input signals to the N number of capacitors, to generate a summed signal;

c) multiplying the summed signal by the ith input signal to generate an ith multiplied signal;

d) integrating the ith multiplied signal to generate an ith integrated signal, wherein the maximum length sequence has a period, the integrating has an integration interval length, and the integration interval length is a P multiple of the period and P is a positive integer; and e) estimating capacitance values of the N number of capacitors according to the N number of integrated signals, respectively, comprising, adding the N number of integrated signals to generate a total summed result;

adding an ith integrated signal of the N number of integrated signals to the total summed result to generate an ith summed result; and dividing the ith summed result by P*(N+1) to generate the capacitance value of the ith capacitor.

9. The detection method according to claim 8, wherein a delay amount of the at least one delayed sequence of the maximum length sequence relative to the maximum length sequence is in a unit of bits.

10. The detection method according to claim 8, wherein step (e) comprises sampling the $i^{th}$ integrated signal at every predetermined interval, wherein the predetermined interval is the P multiple of the period.

11. The detection method according to claim 8, between step (c) and step (d), further comprising:

filtering out high-frequency noises from the $i^{th}$ multiplied signal.

12. The detection method according to claim 8, wherein each of the N number of input signals is a square wave signal, a triangle wave signal, or a semicircle signal.

* * * * *